(12) United States Patent
Hiura

(10) Patent No.: US 6,508,341 B1
(45) Date of Patent: Jan. 21, 2003

(54) PARKING BRAKE DEVICE FOR VEHICLE

(75) Inventor: Tetsuo Hiura, Hiroshima (JP)

(73) Assignee: Kuroishi Iron Works Co., Ltd. (JP)

( * ) Notice: Subject to any disclaimer, the term of this patent is extended or adjusted under 35 U.S.C. 154(b) by 377 days.

(21) Appl. No.: 10/009,208

(22) PCT Filed: Jun. 23, 2000

(86) PCT No.: PCT/JP00/04152
§ 371 (c)(1),
(2), (4) Date: Oct. 7, 2001

(87) PCT Pub. No.: WO01/00466
PCT Pub. Date: Jan. 4, 2001

(30) Foreign Application Priority Data

Jun. 28, 1999 (JP) ............................................. 11-181338
Mar. 17, 2000 (JP) ........................................ 2000-075273

(51) Int. Cl.⁷ ................................................ B60T 7/06
(52) U.S. Cl. ........................... 188/265; 74/539; 74/535; 74/542; 188/216
(58) Field of Search ................................. 188/265, 216, 188/82.1, 2 D, 82.3, 82.7; 74/542, 535, 527, 534, 536, 538, 522, 539, 529, 512, 575

(56) References Cited

U.S. PATENT DOCUMENTS

| 3,273,418 | A | | 9/1966 | Ellis ............................ 74/539 |
| 4,872,368 | A | | 10/1989 | Porter ......................... 74/542 |
| 5,775,174 | A | * | 7/1998 | Konbe et al. ................. 74/542 |

FOREIGN PATENT DOCUMENTS

| EP | 0 527 518 A1 | 8/1991 |
| JP | 7-257333 | 10/1995 |
| JP | 9-76887 | 3/1997 |
| JP | 9-267729 | 10/1997 |

* cited by examiner

Primary Examiner—Douglas C. Butler
(74) Attorney, Agent, or Firm—Lorusso & Loud

(57) ABSTRACT

A device provided with a pedal arm (2) having pawl teeth (12), a latch pawl member (4) having a latch pawl (15) engageable with the pawl teeth (12) for maintaining and releasing a stepped-on position of the pedal arm (2), and a position changing member (5) for allowing the latch pawl member (4) to maintain the position of the pedal arm (2) when the pedal arm is further stepped on from a maintained position. The above constitution realizes a function of setting a braking force by a stepping operation, a function of releasing a braking force by a stepping operation and a function of increasing a braking force by an additional stepping operation.

2 Claims, 16 Drawing Sheets c (Reverse Position)
d (Forward Position)

g (Reverse Position)
h (Forward Position)

PARKING BRAKE DEVICE FOR VEHICLE

This application is a 371 of PCT/JP00/04152 filed Jun. 23, 2000.

TECHNICAL FIELD

The present invention relates to a parking brake device for a vehicle having a releasing system of a foot-operated type.

BACKGROUND ART

Vehicle parking brake devices are largely classified into a hand-operated type and a foot-operated type depending upon the operating form. Foot-operated parking brake devices are being spread mainly among high-grade cars. Many types of foot-operated parking brake devices have been conventionally proposed, and as one of those, a full foot-operated parking brake device in which not only a braking operation (namely, an operation for setting a braking force) but also a releasing operation are conducted by a stepping operation is known.

In a foot-operated parking brake device, there may occur a situation in which, although a braking force is once set by a stepping operation, the amount of stepping is not sufficient and thus a required braking force cannot be obtained. In such a case, an operation for increasing the braking force is required.

However, conventional parking brake devices, in which, when a pedal is further stepped on from an initially set position (so-called "additional stepping operation"), a function of maintaining the pedal position at the moment is released, namely, a braking release operation is conducted, do not have a function of maintaining the pedal at a position after the additional stepping. Thus, when a larger braking force is desired (namely, braking force is desired to be increased) after a braking operation has been conducted to set a braking force, the function of maintaining the pedal position at the moment must be once released to restore the pedal to a set state before the braking operation (namely, the braking force must be vanished). Then, the pedal must be stepped on beyond the initial stepped-on position to a required stepped-on position to set a braking force once again, and an operation for maintaining the condition must be conducted.

As a result, in the conventional parking brake devices, the operation at the time when an increase of the braking force is desired is complicated and thus the operability thereof is poor. Additionally, in the braking force changing operation, the braking force already set is once vanished and a braking force must be set again. Thus, there is no continuity of the braking force before and after the braking force changing operation, resulting in impairment in reliability during operation.

In view of the problems of such a conventional foot-operated parking brake device for a vehicle, the present invention is aimed at improving the operability thereof by allowing a braking force to be increased by an additional stepping operation and enhancing the reliability thereof during operation by securing a continuity of the braking force during the braking force increasing operation.

DESCRIPTION OF THE INVENTION

According to one aspect of the present invention there is provided a parking brake device for a vehicle having brake means, comprising:

a pedal arm (2) having pawl teeth (12) and operatively connected to said brake means such that said brake means performs a braking action when said pedal arm is stepped on;

a latch pawl member (4) including a latch pawl (15) engageable with said pawl teeth (12) of said pedal arm (2), movable between a locked position in which said latch pawl (15) is in locking engagement with said pawl teeth (12) and an unlocked position in which said locking engagement of said latch pawl (15) with said pawl teeth (12) is released, said latch pawl member (4) assuming said locked position, when said pedal arm (2) is stepped on, to maintain said pedal arm (2) in a stepped-on position at the moment and assuming said unlocked position, when said pedal arm (2) is further stepped on from said stepped-on position by a determined amount, to allow said pedal arm (2) to rotate in a direction opposite to the stepping direction thereof;

a position changing member (5) supported on a common support shaft (9) for said latch pawl member (4) and provided with a latch pawl (22) engageable with said pawl teeth (12) of said pedal arm (2), said position changing member (5) being operatively connected to said pedal arm (2) and said latch pawl member (4) and adapted for shifting said latch pawl member (4) from said unlocked position to said locked position by a stepping force applied to said pedal arm (2) when said pedal arm (2) is stepped on by an amount over said determined amount;

a first engaging portion (23) provided on said position changing member (5) and engageable with said latch pawl member (4) when said latch pawl member (4) assumes said locked position to maintain said position changing member (5) at such a position that said latch pawl (22) is separated from said pawl teeth (12) of said pedal arm (2); and a second engaging portion (24) provided on said position changing member (5) and engageable with said latch pawl member (4) when said latch pawl member (4) assumes said unlocked position to maintain said position changing member (5) at such a position that said latch pawl (22) is engaged by said pawl teeth (12) of said pedal arm (2).

In another aspect, the present invention provides a parking brake device for a vehicle having brake means, comprising:

a pedal arm (42) rotatably mounted on a mounting bracket (41) fixedly disposed on a vehicle body and operatively connected to said brake means such that said brake means performs a braking action when said pedal arm is stepped on;

a pawl teeth member (43) including pawl teeth (52) and fixed to said mounting bracket (41);

a latch pawl member (44) including a latch pawl (55) engageable with said pawl teeth (52) of said pawl teeth member (43), movable between a locked position in which said latch pawl (55) is in locking engagement with said pawl teeth (52) and an unlocked position in which said locking engagement of said latch pawl (55) with said pawl teeth (52) is released, said latch pawl member (44) assuming said locked position, when said pedal arm (42) is stepped on, to maintain said pedal arm (42) in a stepped-on position at the moment and assuming said unlocked position, when said pedal arm (42) is further stepped on from said stepped-on position by a determined amount, to allow said pedal arm (42) to rotate in a direction opposite to the stepping direction thereof;

a position changing member (45) supported on a common support shaft (49) for said latch pawl member (44) and operatively connected to said pedal arm (42) and said latch pawl member (44) for shifting said latch pawl member (44) from said unlock position to said locked position by a stepping force applied to said pedal arm (42) when said pedal arm (42) is stepped on by an amount over said determined amount;

and an engaging portion (64) provided on said position changing member (45) and engageable with said latch pawl member (44) when said latch pawl member (44) assumes said locked position to maintain the position of said position changing member (45), and with said latch pawl member (44) when said latch pawl member (44) assumes said unlocked position to maintain the position of said latch pawl member (44).

The preferred embodiments of the present invention will be hereinafter described in detail with reference to the drawings, in which FIG. 1 is a view explanatory of an essential part of a parking brake device for a vehicle according to a first embodiment of the present invention in a set state;

First Embodiment

Figure 1:
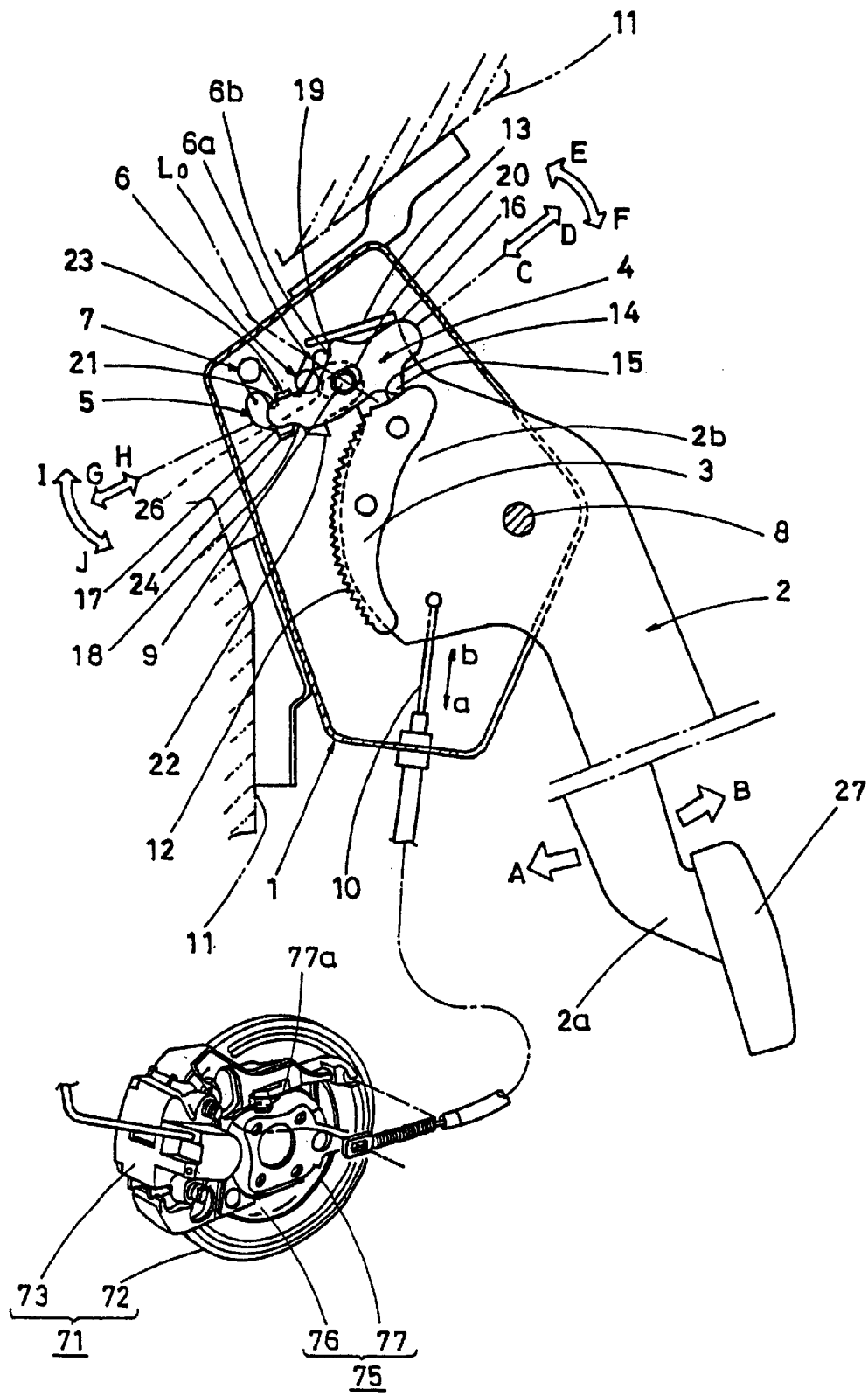
Figure 2:
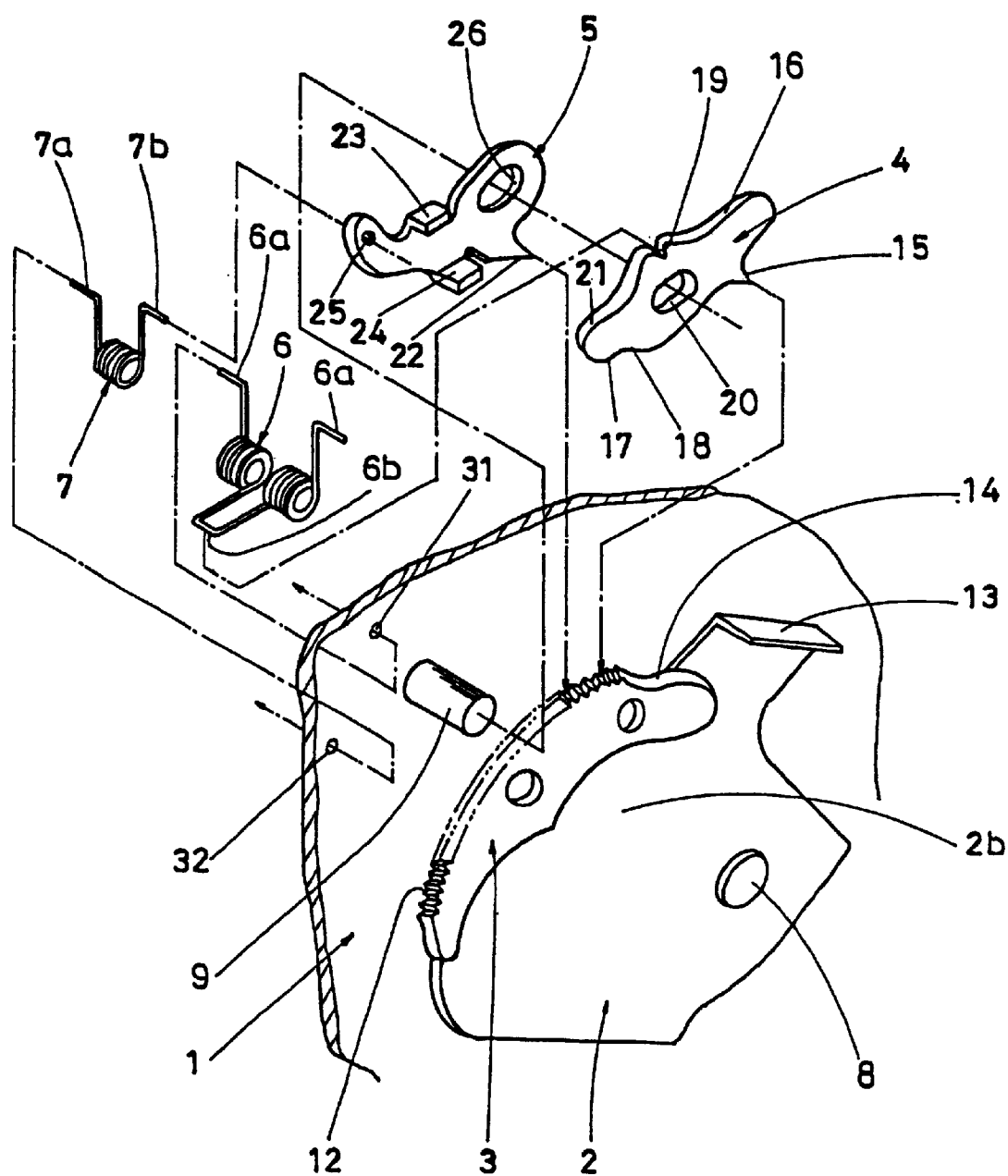
FIG. 2 is a perspective exploded view illustrating the on-assembling state of the major constructional members of the parking brake device for a vehicle shown in FIG. 1.

FIG. 1 shows an essential part of a parking brake device for a vehicle according to a first embodiment of the present invention, and FIG. 2 shows an on-assembling state of the constructional members thereof. In these Figures, designated as 1 is a mounting bracket secured to a body side member 11, as 2 is a pedal arm, which is step-operated by a driver. The pedal arm 2 has a foot plate 27 at one end 2a thereof. To the other end 2b of the pedal arm 2 is secured a pawl teeth member 3 having pawl teeth 12 extending in an arc outwardly from the other end 2b.

The pawl teeth member 3 has one end side provided with a retreat portion 14 located at a level lower than the pawl teeth 12. A guide plate 13 extending in a direction perpendicular to the plane direction of the pedal arm 2 is provided at a position a predetermined distance outwardly away from the retreat portion 14 in the plane direction of the pedal arm 2.

The pedal arm 2 constituted as above is rotatably supported at a position near the other end on a pedal support pin 8 protruded from the mounting bracket 1, whereby the pedal arm 2 is mounted on the mounting bracket 1. With the pedal arm 2 mounted on the mounting bracket 1, one end of a parking cable 10 is connected to the pedal arm 2 at a position in the vicinity of the other end 2b. The other end of the parking cable 10 is connected to brake means 75. The parking cable 10 is normally pulled toward a pull-in side (in the direction of the arrow a) so that the pedal arm 2 is normally rotationally urged in a direction (the direction of the arrow B) opposite to the stepping direction (the direction of the arrow A) by a tensile force of the parking cable 10. In this embodiment, as shown in FIG. 1, a handbrake mechanism comprising a drum 76 and a band 77 is employed as the brake means 75, which is integrally installed into brake means 71 for a main brake device including a brake disc 72 and a caliper 73. The other end of the parking cable 10 is connected to an end portion 77a of the band 77. As the brake means 75, any commonly used means may be employed for the purpose of the present invention.

When a stepping force is applied onto the foot plate 27, the pedal arm 2 is stepped on against a rotational urging force caused by the tensile force of the parking cable 10 and rotated in the direction of the arrow A. Along with the rotation of the pedal arm 2, the parking cable 10 is pulled in the direction of the arrow b so that a braking force corresponding to the amount of stepping (the amount of rotation) of the pedal arm 2 is exerted on the brake means 75.

The mounting bracket 1 has a spindle 9 fixedly erected at a position properly remote from the pawl teeth member 3, and a latch pawl member 4 and a position changing member 5, which will be hereinafter described, are mounted thereon.

As shown in FIG. 2, the latch pawl member 4 is a plate having a generally ellipse shape and has a slot 20 formed at a generally center part thereof with its major axis generally coinciding with the longitudinal direction thereof. On the periphery of the latch pawl member 4A in one end in the longitudinal direction thereof, there are formed a pawl 15 having a shape engageable with the pawl teeth 12 of the pawl teeth member 3 and a sliding contact engagement portion 16 having an arcuate surface at opposed positions in the direction of the minor axis of the slot 20. A linear latch portion 21 is formed at a position on the periphery of the latch pawl member 4 on the other end side in the longitudinal direction thereof and on the same side as the sliding contact engagement portion 16. A linearly extending first contact portion 17 is formed at a position on the same side as the pawl 15 and opposed to the latch portion 21, and a corner-shaped second contact portion 18 is formed at an end part of the first contact portion 17. A notch like catch portion 19 is formed at a position on the same side as the sliding contact engagement portion 16 and the latch portion 21 and generally corresponding to the slot 20.

The position changing member 5 is a plate having a slot 26 formed at a position near one end in the longitudinal direction thereof and a catch portion 25 comprising a small hall formed at a position near the other end thereof as shown in FIG. 2. A latch pawl 22 engageable with the pawl teeth 12 of the pawl teeth member 3 is formed at a position generally corresponding to the slot 26 on the periphery of the position changing member 5. A pair of engaging portions 23 and 24 extending in a direction generally perpendicular to the plane direction of the position changing member 5 and opposed to each other are formed at positions between the catch portion 25 and the slot 26 thereof.

As shown in FIG. 1 and FIG. 2, the support shaft 9 extends through the slot 20 of the latch pawl member 4 and the slot 26 of the position changing member 5 with the latch pawl member 4 laid upon on the side from which the engaging portion 23 and 24 extend of the position changing member, whereby the latch pawl member 4 and the position changing member 5 are mounted on to the mounting bracket 1. In this state, the first and second engaging portions 23 and 24 of the position changing member 5 are opposed to the latch portion 21 of the latch pawl member 4 and the first contact portion 17 of the position changing member 5, respectively.

Relative movement of the support shaft 9 within the range of the slot 20 and in the direction of the major axis thereof allows movement of the latch pawl member 4 in the directions of the arrows C–D (the positions when the latch pawl member 4 is moved in the directions of the arrows D and C may be hereinafter referred to as "forward position" and "reverse position", respectively, for the sake of convenience for explanation). Relative movement of the support shaft 9 within the range of the slot 26 and in the direction of the major axis thereof allows movement of the position changing member 5 in the directions of the arrows G–H (the positions when the position changing member 5 is moved in the directions of the arrows H and G are hereinafter referred to as "forward position" and "reverse position", respectively, for the sake of convenience for explanation).

With the latch pawl member 4 and the position changing member 5 assembled on the mounting bracket 1, first and second urging members 6 and 7 are assembled on the latch pawl member 4 and the position changing member 5, respectively.

Figure 5:
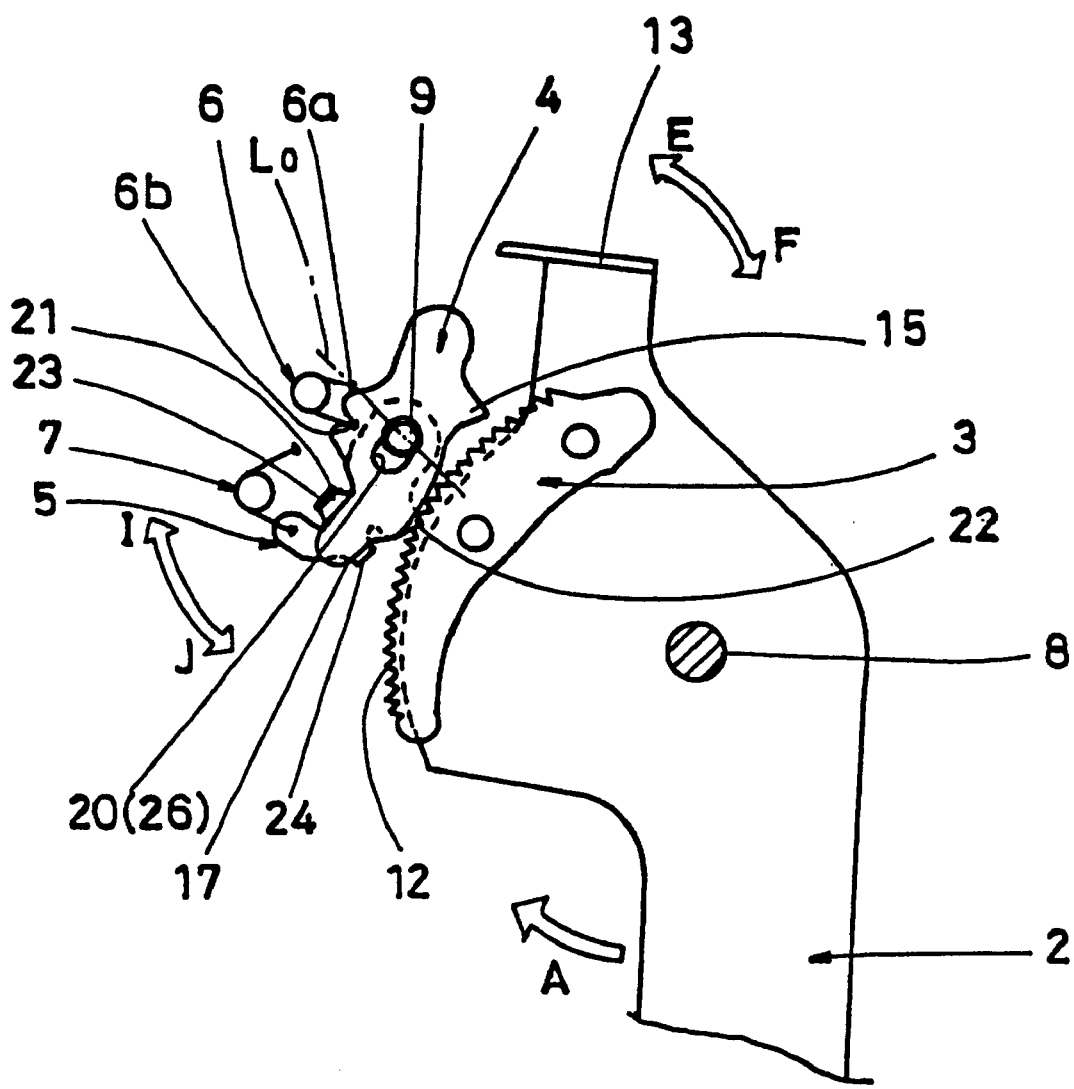
FIG. 5 is a view explanatory of the structure of an essential part of the parking brake device for a vehicle shown in FIG. 1 in an unlocked state.

The first urging member 6 comprises a coil shaped torsion spring having first stop portions 6a and 6a located at the opposed end thereof and each fixedly inserted in catch holes 31 formed in the mounting bracket 1, and a second stop portion 6b located at the center part thereof and caught in the catch portion 19 of the latch pawl member 4. The latch pawl member 4 is rotationally urged by an urging force of the first urging member 6. In this case, the direction of rotation urged by the first urging member 6 varies depending upon the position of the latch pawl member 4. Namely, when the latch pawl member 4 is in the "forward position", the second stop portion 6b of the first urging member 6 is located on the side of the latch pawl 15 with respect to a reference line $L_0$, which is a straight line connecting the first stop portion 6a of the first urging member 6 and the support shaft 9 as shown in FIG. 1 so that the first urging member 6 is urged in such a direction that the latch pawl 15 is moved closer to the pawl teeth member 3 (the direction of the arrow F) by an urging force of the first urging member 6. On the other hand, when the latch pawl member 4 is in the "reverse position", the second stop portion 6b of the first urging member 6 is located on the other side of the latch pawl 15 with respect to the reference line $L_0$ as shown in FIG. 5 so that the latch pawl member 4 is urged in such a direction that the latch pawl 15 is moved away from the pawl teeth member 3 (the direction of the arrow E) by the urging force of the first urging member 6.

The second urging member 7 comprises a coil shaped torsion spring having a first stop portion 7a located at one end thereof and fixedly inserted in a catch hole 32 formed in a mounting bracket 1 and a second stop portion 7b located at the other end thereof and caught in a catch portion 25 of the position changing member 5. The position changing member 5 is normally urged to the side of the "reverse position" (in the direction of the arrow G) by the second urging member 7. The position changing member 5 is, as described below, shifted from the "reverse position" to the "forward position" along with the rotation of the pedal arm 2 in the stepping direction thereof (the direction of the arrow A) when the latch pawl 22 is locked with one of the pawl teeth 12 of the pawl teeth member 3. The position changing member 5 is, as described below, rotated following the rotation of the latch pawl member 4 in the directions of the arrows E–F in such a directions that the latch pawl 22 is moved away from and closer to the pawl teeth 12 of the pawl teeth member 3 (the directions of the arrows I–J).

The operation of the parking brake device for a vehicle of this embodiment will be next described with reference to FIG. 1 to FIG. 10.

① Set state (see FIG. 1)

A set state shown in FIG. 1 is a condition in which no stepping operation is conducted on the pedal arm 2 as when the vehicle is running and thus the parking cable 10 has been pulled back in the direction of the arrow "A so that no braking force is exerted on the brake means 75. In this set state, the latch pawl member 4 is in the "forward position". Thus, the latch pawl member 4 is urged in the direction of the arrow F by the urging force of the second stop portion 6b and the latch pawl 15 abuts on the retreat portion 14 of the pawl teeth member 3 (in this state, the sliding contact engagement portion 16 of the latch pawl member 4 is in engagement with the guide plate 13 of the pedal arm 2, whereby the position of the latch pawl member 4 is maintained). The position changing member 5 is set at the "reverse position" by the second urging member 7. The catch portion 21 of the latch pawl member 4 is in engagement with the first engaging portion 23 of the position changing member 5, whereby the position changing member 5 has been rotated in the direction of the arrow I corresponding to the position of the latch pawl member 4.

Figure 3:
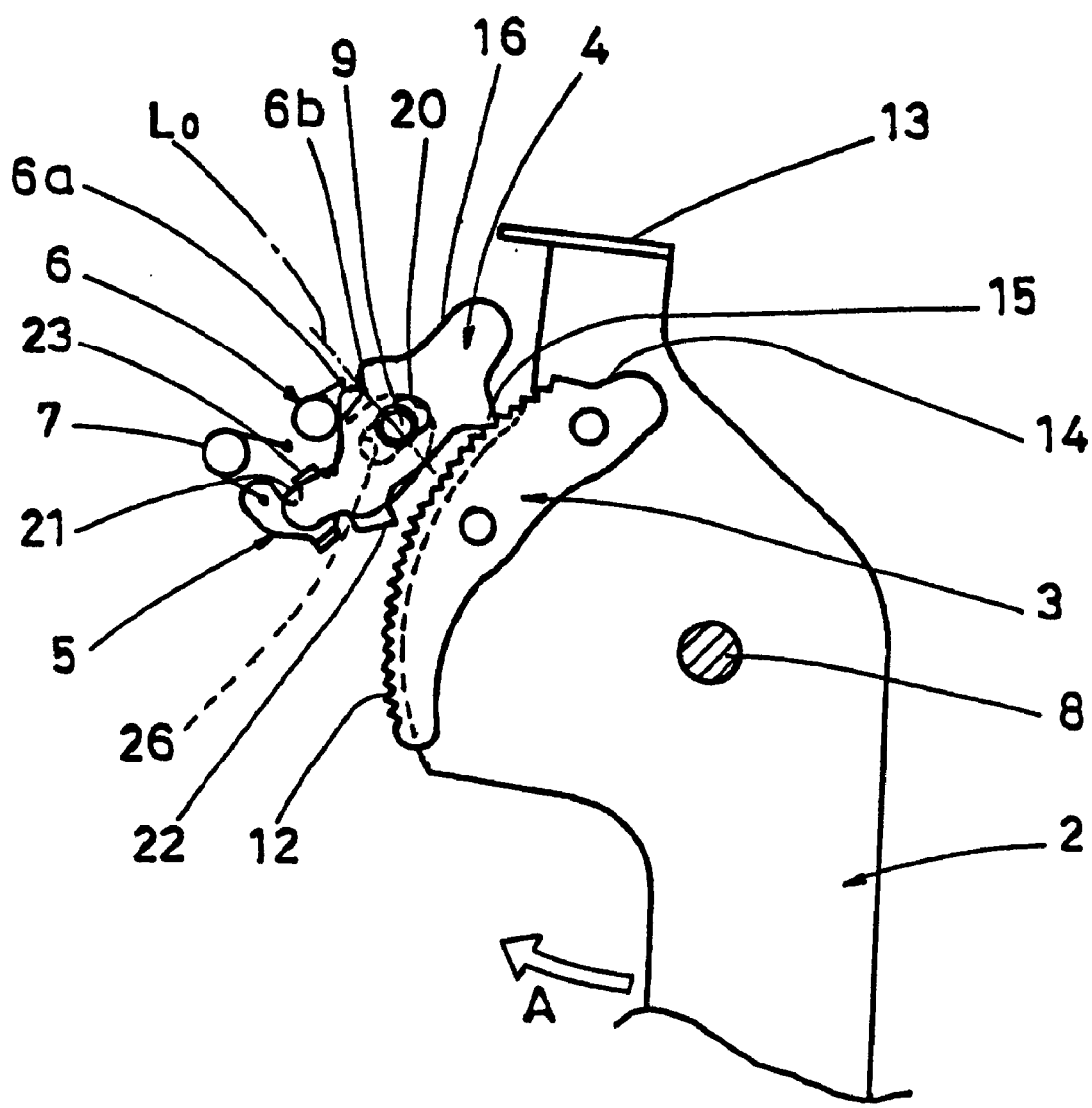
FIG. 3 is a view explanatory of the structure of an essential part of the parking brake device for a vehicle shown in FIG. 1 during a stroke.
Figure 4:
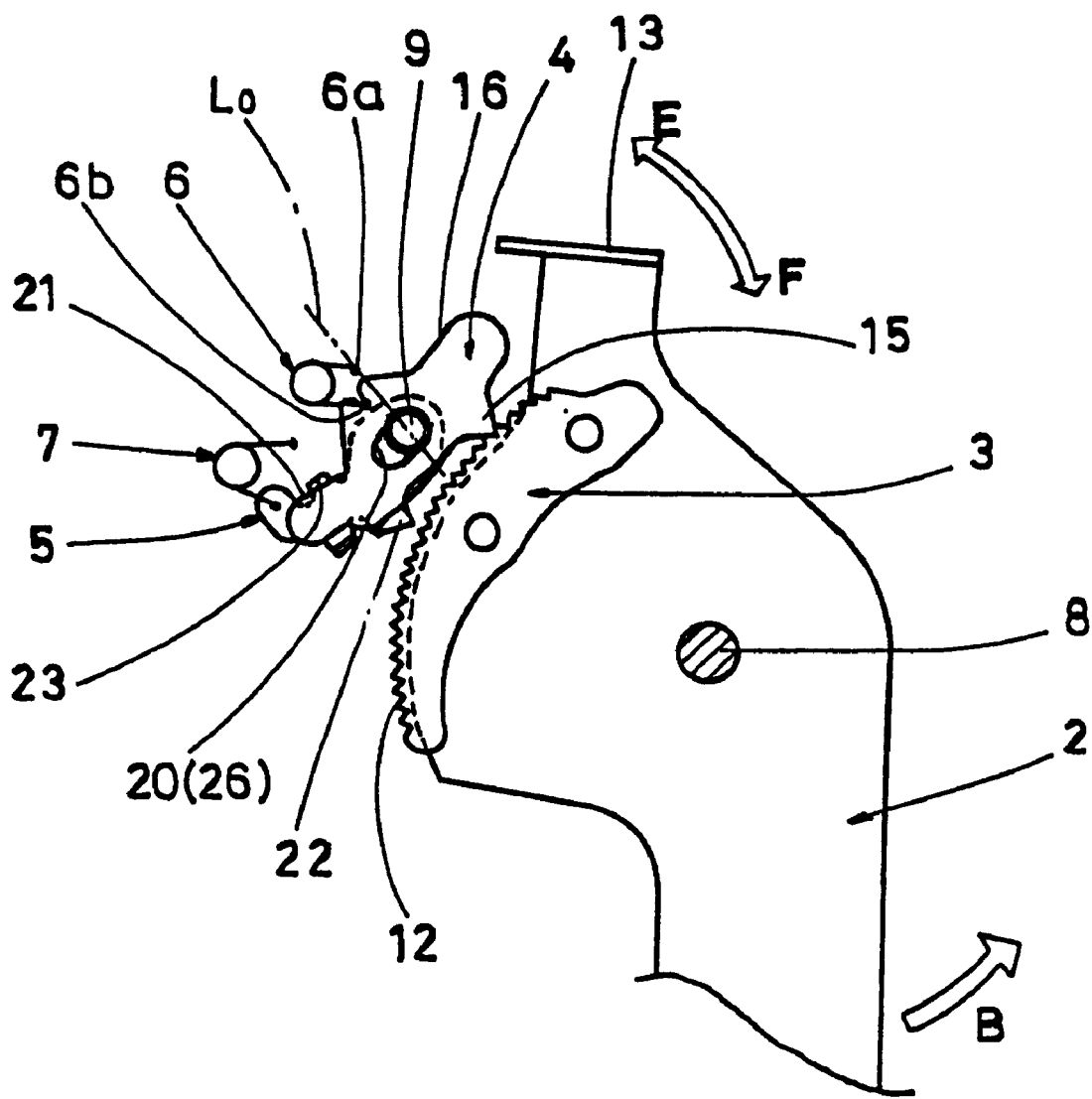
FIG. 4 is a view explanatory of the structure of an essential part of the parking brake device for a vehicle shown in FIG. 1 in a locked state.

② At the time of braking operation from the set state (see FIG. 1, FIG. 3 and FIG. 4)

When the pedal arm 2 in the set state shown in FIG. 1 is stepped on and rotated in the direction of the arrow A, the latch pawl 15 of the latch pawl member 4 is slid on the retreat portion 14 of the pawl teeth member 3 to the side of the pawl teeth 12 by the rotation of the pawl teeth member 3 along with the rotation of the pedal arm 2, and moved in contact with the pawl teeth 12 while the stepping operation of the pedal arm 2 is continued (the state shown in FIG. 3).

When the stepping operation of the pedal arm 2 is ceased and the stepping force is released, the pedal arm 2 inversely rotated in the direction of the arrow B by a tensile force of the parking cable 10 as shown in FIG. 4. At this time, the latch pawl 15 of the latch pawl member 4 is locked with one of the pawl teeth 12 abutting thereon at that time. Thus, the latch pawl member 4, which receives a rotational force of the pedal arm 2 in the direction of the arrow B with its locking position maintained, is shifted from the "forward position" to the side of the "reverse position" and stopped at the "reverse position" (a state shown in FIG. 4, and the position of the latch pawl member 4 at this time is the locked position mentioned in Claims). In this state, the stepped-on position of the pedal arm 2 is maintained by the latch pawl member 4 and thus the brake means 75 maintains the braking force at the moment (namely, the braking operation is completed).

In this state, since the latch pawl member 4 is set at the "reverse position" as shown in FIG. 4, the second stop portion 6b of the first urging member 6 is located on the other side of the latch pawl 15 with respect to the reference line $L_0$, and the latch pawl member 4 is rotationally urged in such a direction that the latch pawl 15 is moved away from the pawl teeth member 3 (the direction of the arrow E) by the urging force of the first urging member 6. However, an action for regulating the position of the latch pawl member 4 by a locking force acting between the latch pawl 15 and the pawl teeth 12 surpasses the above rotational urging force so that the latch pawl member 4 maintains the rotational position thereof.

Figure 6:
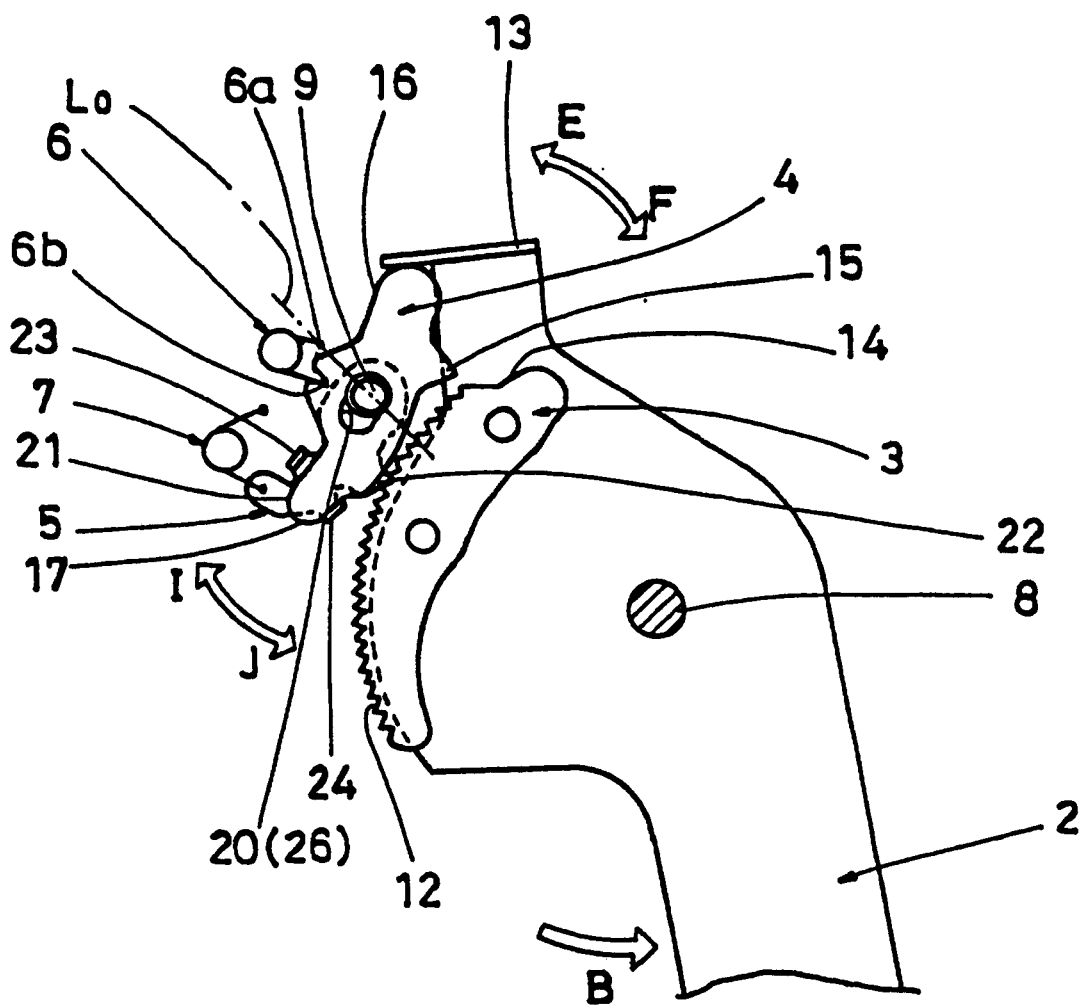
FIG. 6 is a view explanatory of the structure of an essential part of the parking brake device for a vehicle shown in FIG. 1 in a state immediately before setting.

③ Braking release operation (see FIG. 5 and FIG. 6)

At the time of a braking release operation by which the braking force is released from the state shown in FIG. 4 in which the braking force is maintained to permit the vehicle to run, the pedal arm 2 is first slightly stepped on and rotated in the direction of the arrow A as shown in FIG. 5 (the "amount of rotation" is sufficient when it is large enough to be able to release the locking engagement of the pawl teeth 12 with the latch pawl 15, and corresponds to "determined amount" mentioned in claims). Then, the latch pawl member 4 is released from the locking engagement with one of the pawl teeth 12 of the pawl teeth member 3 and rotated in the direction of the arrow E by the urging force of the first urging member 6. At this time, since the first contact portion 17 of the latch pawl member 4 is brought into engagement with the second engaging portion 24 of the position changing member 5 by the rotation of the latch pawl member 4, the position changing member 5 is rotated in such a direction that the latch pawl 22 is moved closer to the pawl teeth 12 (the direction of the arrow J) and the latch pawl 22 is locked at a determined position on the pawl teeth 12 (the state shown in FIG. 5).

In this state, however, the position changing member 5 (and the latch pawl member 4) is rotatable against the urging force of the first urging member 6 in such a direction that the latch pawl 15 is moved away from the pawl teeth 12. Thus, in this state, when the stepping force applied to the pedal arm 2 is released and the pedal arm 2 is rotated in the direction of the arrow B by the tensile force of the parking cable 10 as shown in FIG. 6, the latch pawl 22 of the position changing member 5 is slid on the pawl teeth 12, thereby allowing a rotation of the pedal arm 2 (the position of the latch pawl member 4 at the moment is the unlocked position mentioned in claims).

Then, as shown in FIG. 6, when the latch pawl 15 of the latch pawl member 4 comes to a position in the vicinity of an end of the pawl teeth 12, the sliding contact engagement portion 16 of the latch pawl member 4 is brought into engagement with the guide plate 13 of the pedal arm 2. Thus, when the pawl arm 2 is further restored, the latch pawl member 4 is pressed by the guide plate 13 and the latch pawl 15 thereof is positioned on the side of the retreat portion 14 of the pawl teeth member 3. In this case, the latch pawl member 4 is gradually forced to rotate in the direction of the arrow F along with the rotation of the pedal arm 2 in the direction of the arrow B. Since the second stop portion 6b of the first urging member 6 is moved to the side of the latch pawl 15 with respect to the reference line $L_0$ along with the rotation of the latch pawl member 4, the latch pawl member 4 is shifted from the "reverse position" to the side of the "forward position" by the urging force of the first urging member 6, and eventually brought into the set state shown in FIG. 1. Thereby, the action required for the braking release operation is completed.

④ Operation for increasing braking force from a braking state by additional stepping (see FIG. 7 to FIG. 10)

In a braking state shown in FIG. 4, a braking force corresponding to the amount of stepping of the pedal arm 2 is obtained. When the braking force already set is smaller than that desired by the driver and an additional increase in the braking force is required, a braking force increasing operation is conducted. Namely, in a state shown in FIG. 4, the pedal arm 2 is slightly stepped on into the released state shown in FIG. 5. After that, the pedal arm 2 is stepped on by a desired amount to increase the braking force applied to the brake means 75. More specifically, when the pedal arm 2 is further stepped on from the braking released state shown in FIG. 5, the latch pawl 22 of the position changing member 5 has already locked with one of the pawl teeth 12 of the pawl teeth member 3 by the above release operation so that the position changing member 5 is allowed to rotate in such a direction that the latch pawl 22 is moved away from the pawl teeth 12 but inhibited from rotating in such a direction that the latch pawl 22 is moved closer to the pawl teeth 12.

Figure 7:
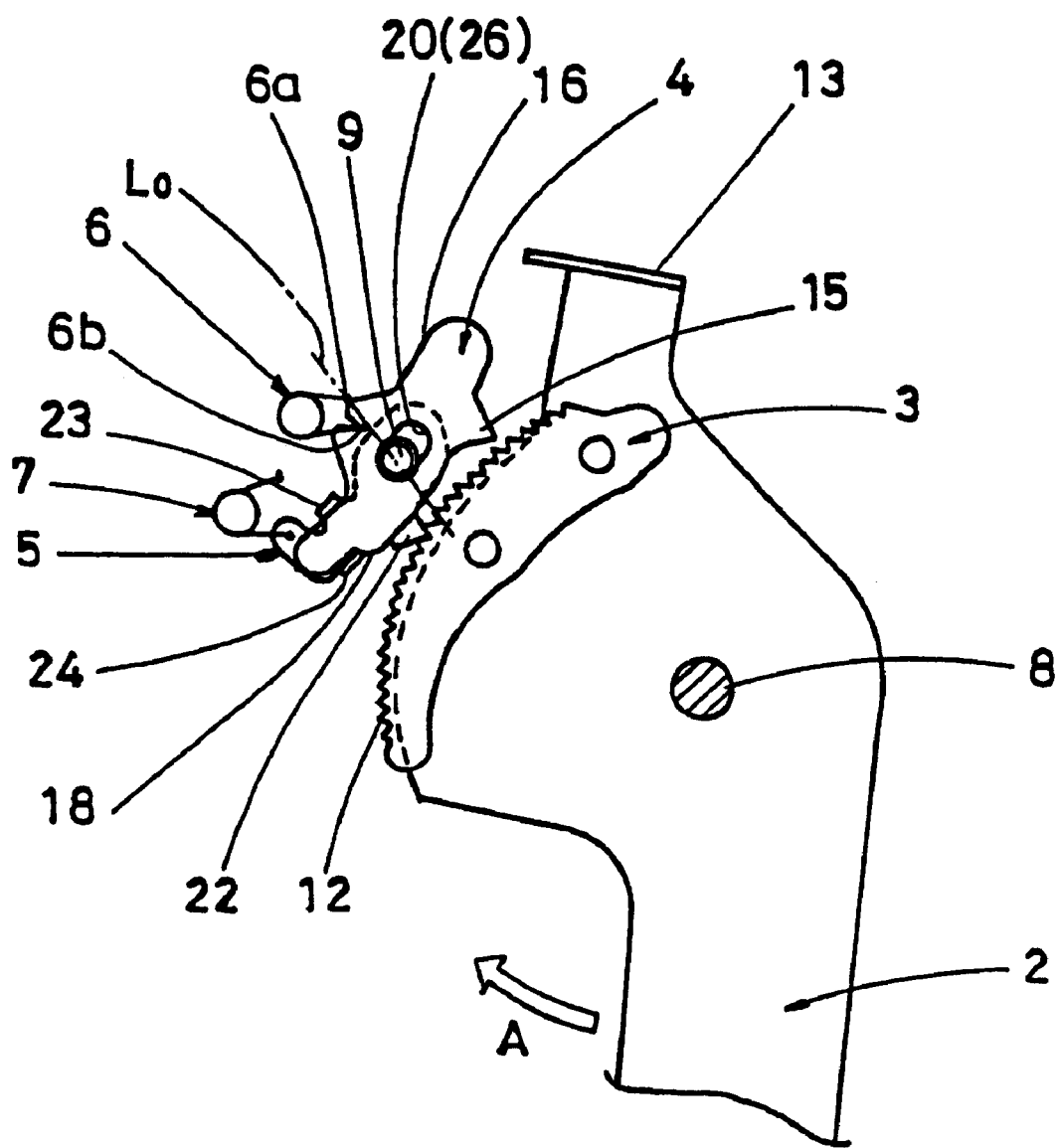
FIG. 7 is a view explanatory of the structure of an essential part of the parking brake device for a vehicle shown in FIG. 1 at the time when an additional stepping is started.

Thus, when the pedal arm 2 is stepped on, the position changing member 5 is shifted from the "reverse position" to the side of the "forward position" along with the rotation of the pedal arm 2 in the direction of the arrow A as shown in FIG. 7. In this case, the second engaging portion 24 of the position changing member 5 is brought into engagement with the second contact portion 18 of the latch pawl member 4, whereby the latch pawl member 4 is shifted from the "reverse position" to the side of the "forward position" together with the position changing member 5.

Figure 8:
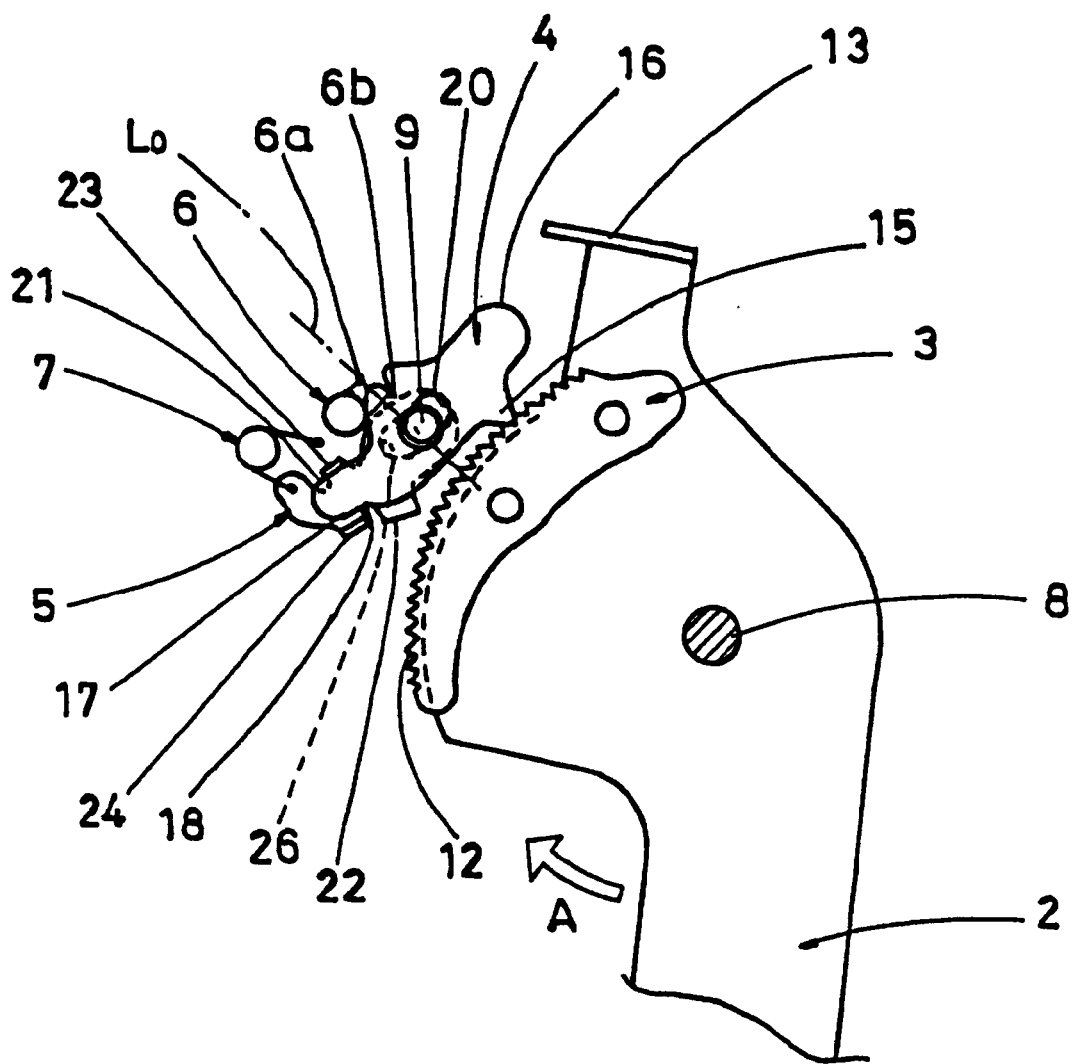
FIG. 8 is a view explanatory of the structure of an essential part of the parking brake device for a vehicle shown in FIG. 1 during an additional stepping stroke.

When the latch pawl member 4 reaches the "forward position", the second stop portion 6b of the first urging member 6 has been moved to the side of the latch pawl 15 with respect to the reference line $L_0$ as shown in FIG. 8, whereby the latch pawl member 4 is rotated in such a direction that the latch pawl 15 is moved closer to the pawl teeth 12 by the urging force of the first urging member 6. Thereby, the latch pawl 15 becomes lockable with the pawl teeth 12. Namely, the latch pawl member 4 is in a state to allow the pedal arm 2 to rotate in the stepping direction thereof with the latch pawl 15 thereof in sliding contact with the pawl teeth 12. Thus, the pedal arm 2 can be continuously stepped on to a required stepped-on position (see FIG. 9).

The latch portion 21 of the latch pawl member 4 is brought into engagement with the first engaging portion 23 of the position changing member 5 along with the rotation of the latch pawl member 4, whereby the position changing member 5 is rotated in such a direction that the latch pawl 22 is moved away from the pawl teeth 12 and shifted from the "forward position" to the "reverse position" by the urging force of the second urging member 7.

Figure 9:
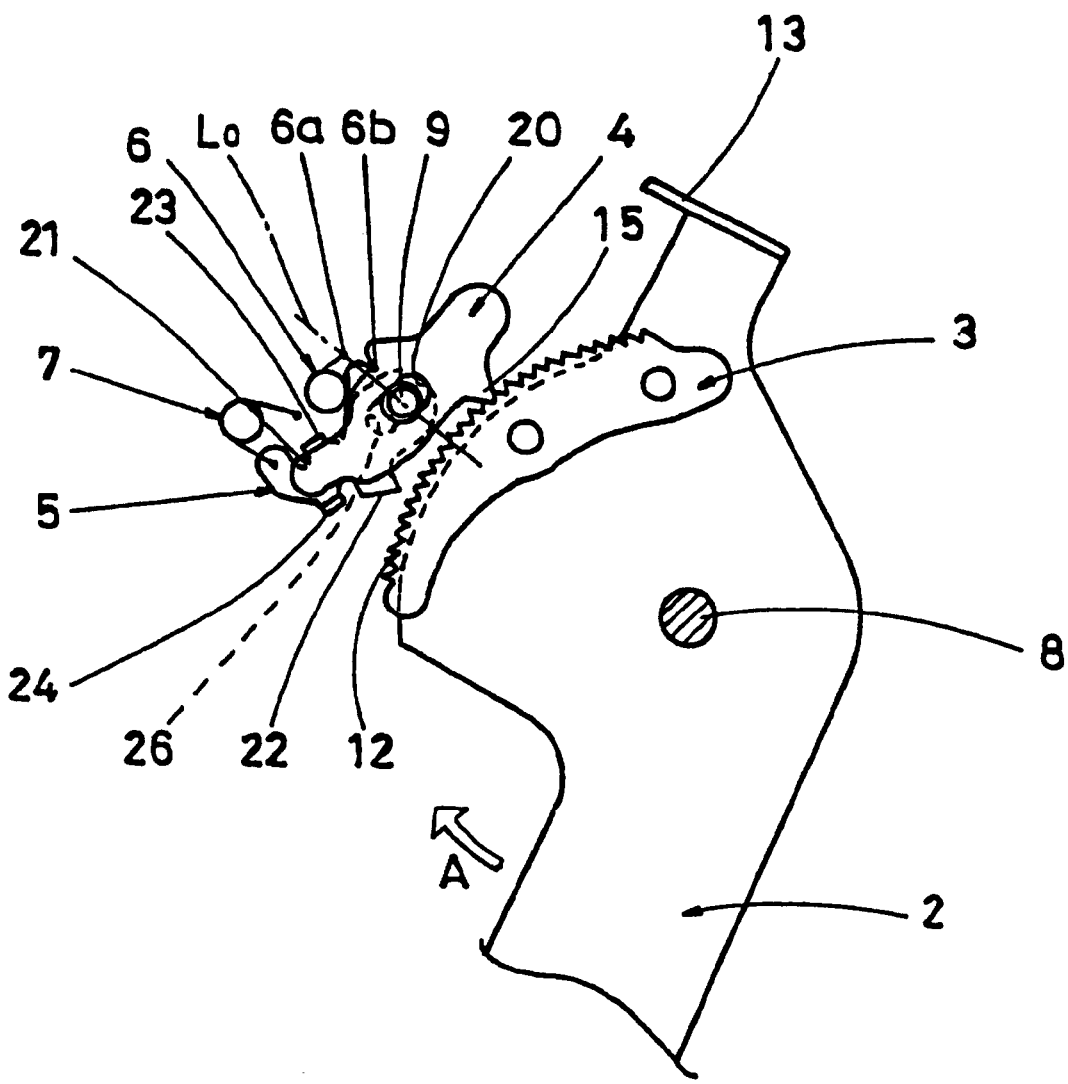
FIG. 9 is a view explanatory of the structure of an essential part of the parking brake device for a vehicle shown in FIG. 1 in a state in which the additional stepping has been completed.
Figure 10:
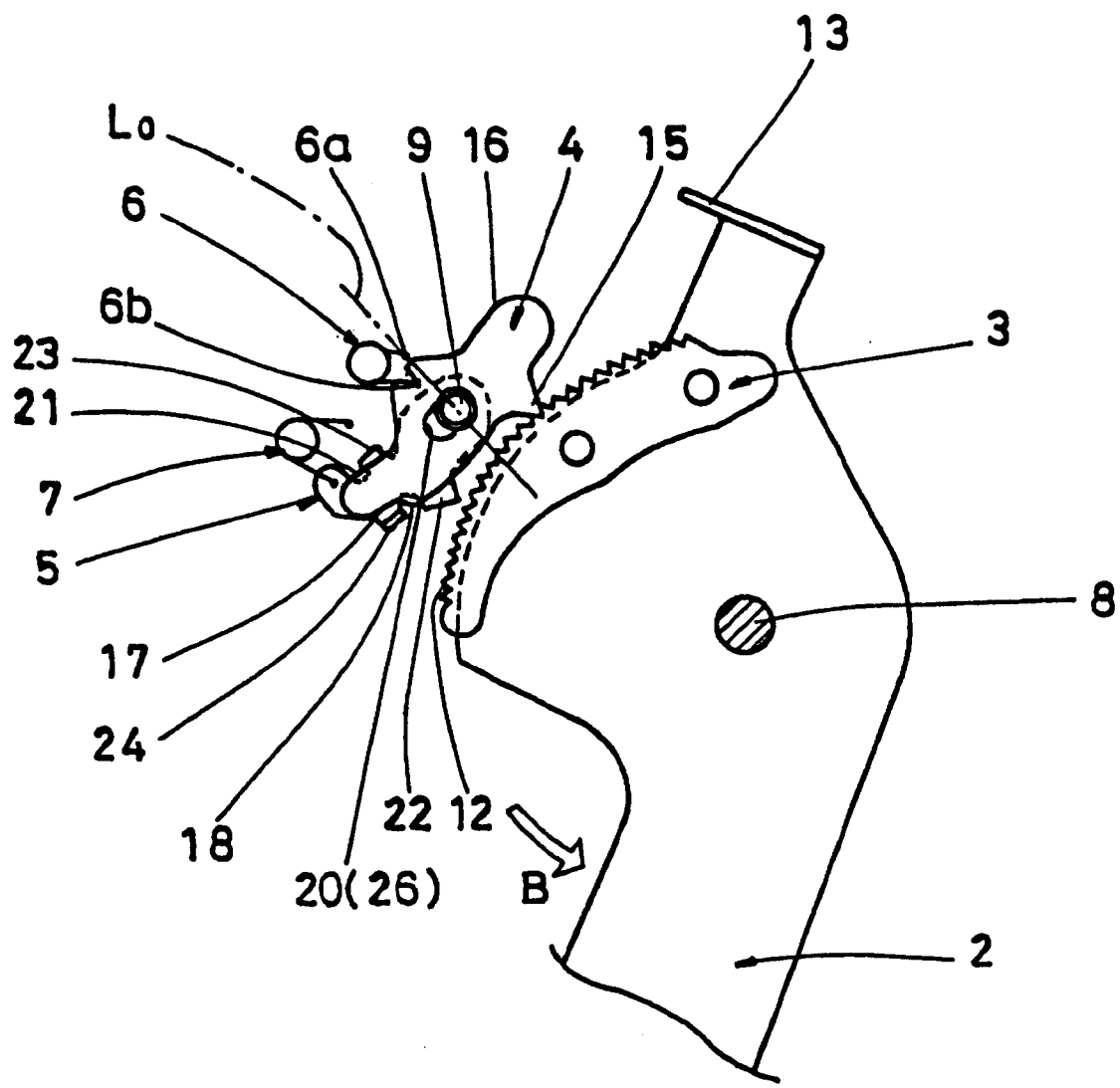
FIG. 10 is a view explanatory of the structure of an essential part of the parking brake device for a vehicle shown in FIG. 1 in a locked state after the completion of an additional stepping.

When the stepping force applied to the pedal arm 2 is released in the state shown in FIG. 9 (namely, a state in which the additional stepping of the pedal arm 2 has been completed), the pedal arm 2 is inversely rotated in the direction of the arrow B by the tensile force of the parking cable 10 as shown in FIG. 10 and the latch pawl 15 of the latch pawl member 4 is locked with one of the pawl teeth 12. Thus, the latch pawl member 4 is shifted from the "forward position" to the side of the "reverse position" by a rotational force of the pedal arm 2 and maintains the stepped-on position of the pedal arm 2, namely the braking force of the brake means (the braking force after the increase). Thereby, the operation for increasing the braking force by additional stepping is completed.

The operation and the action for releasing braking from the braking state after the completion of an increase of the braking force, which are the same as those described in ③, are omitted here.

Second Embodiment

Figure 11:
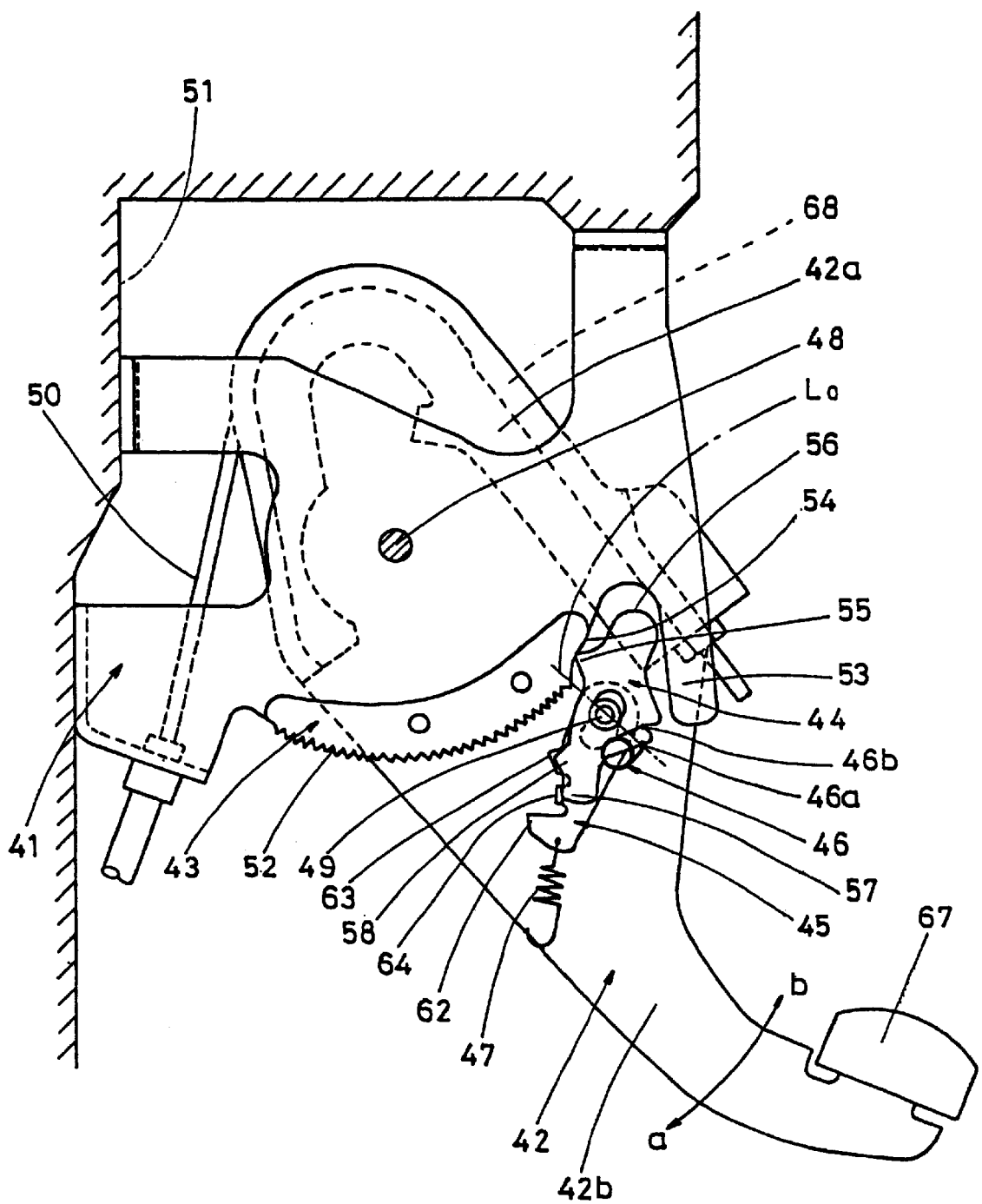
FIG. 11 is a view explanatory of the structure of an essential part of a parking brake device for a vehicle according to a second embodiment of the present invention in a set state.

FIG. 11 shows a parking brake device for a vehicle according to a second embodiment of the present invention. The parking brake device, which is a foot-released type parking brake device having generally the same constitution as the parking brake device according to the first embodiment on the whole, includes a mounting bracket 41, a pedal arm 42, a pawl teeth member 43, a latch pawl member 44, and a position changing member 45, which will be hereinafter described. The major difference between the parking brake device of this embodiment and the parking brake device of the first embodiment is that in the parking brake device of the first embodiment the pawl teeth member 43 is disposed on the side of the pedal arm 42 and the latch pawl member 44 and the position changing member 45 are disposed on the side of the mounting bracket 41 whereas in the parking brake device of the second embodiment, on the contrary, the pawl teeth member 43 is disposed on the side of the mounting bracket 41 and the latch pawl member 44 and the position changing member 45 are disposed on the side of the pedal arm 42. The parking brake device according to the second embodiment will be hereinafter described in detail, considering the above difference.

The mounting bracket 41 is a plate having a determined thickness and fixedly disposed on a vehicle side member 51. A hereinafter described pedal arm 42 is fixed to a generally center part of the mounting bracket 41 via a pedal support pin 48 and a hereinafter described pawl teeth member 43 is secured to an edge on one end side thereof properly apart from the pedal support pin 48.

The pawl teeth member 43 is integrally formed by an arcuate plate and provided with pawl teeth 52, 52 . . . on a peripheral surface thereof. A sliding contact engagement portion 54 comprising a lower level surface continuing from the pawl teeth 52, 52 . . . is formed at one end side of the pawl teeth 52, 52 . . . The pawl teeth member 43 is secured to an edge of the mounting bracket 41 with the pawl teeth 52, 52 . . . directed outward in the plane direction of the mounting bracket 41. The radius of curvature of the pawl teeth 52, 52 . . . and the fixing position of the pawl teeth member 43 to the mounting bracket 41 are determined such that the pawl teeth 52, 52 . . . are located on an arc about the pedal support pin 48.

The pedal arm 42, which is integrally formed by a plate, includes a base end portion 42a having a generally ellipse shape and a lever like end portion 42b continuing from the base end portion 42a and extending frontward. A foot plate 67 is mounted on the end portion 42b. Along a periphery of the base end portion 42a is fixed a cable guide 68, about which an end side of a parking cable 50 is trained with the end secured thereto. The pedal arm 42 is pivoted on the side of the base end portion 42a by the pedal support pin 48 to the mounting bracket 41 rotatably forward and backward about the pedal support pin 48. When the foot plate 67 is stepped on, the pedal arm 42 is rotated about the pedal support pin 48 in the direction of the arrow a and pulls the parking cable 50 to apply a braking force corresponding to the amount of stepping thereof to brake means (not shown) connected to the other end of the parking cable 50. When the stepping force applied to the foot plate 67 is released, the pedal arm 42 receives a tensile force from the brake means side transmitted via the parking cable 50 and is pulled down in the direction of the arrow b to be restored to a set position. Thereby, the braking force applied to the braking means is released.

A support shaft 49 is protruded from a position between the base end portion 42a and the end portion 42b of the pedal arm 42 and properly remote from the periphery of the pawl teeth member 43 of the mounting bracket 41. A latch pawl member 44 and a position changing member 45, which will be hereinafter described, are mounted on the support shaft 49 in overlapping relation in the thickness direction thereof.

Figure 16:
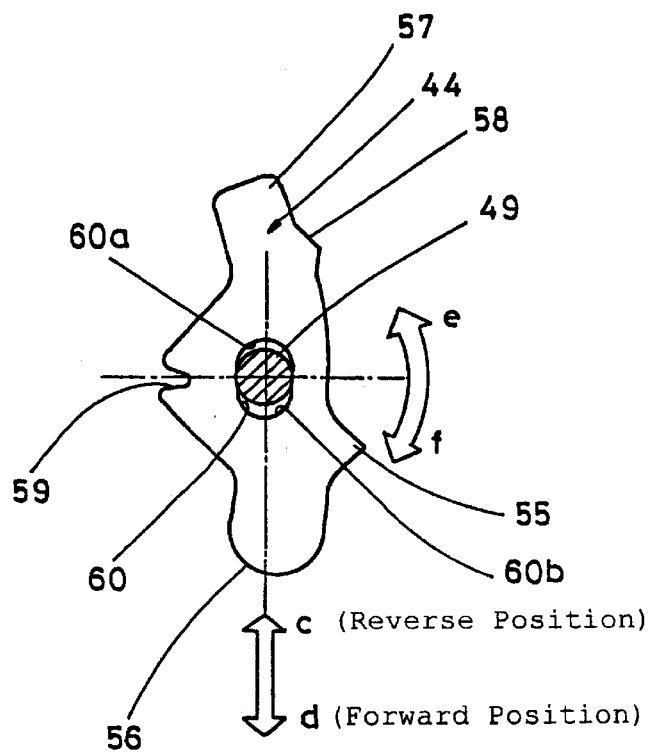
FIG. 16 is a front view of a latch pawl member shown in FIG. 11.

As shown in FIG. 16, the latch pawl member 44 is an oblong plate having a slot 60 formed in a generally center part thereof with its major axis extending in the longitudinal direction thereof. A contact portion 57 having a linear catch surface and a guide portion 58 continuing from an end of the contact portion 57 and obliquely extending upward are respectively formed at a position on one end side in the longitudinal direction of the latch pawl member 44. A sliding contact engagement portion 56 having an arcuate shape is formed on the other end side in the longitudinal direction of the latch pawl member 44. A latch pawl 55 selectively engageable with one of the pawl teeth 52, 52 . . . of the pawl teeth member 43 is formed at one end side in the transverse direction of the latch pawl member 44 and a notch like catch portion 59 is formed at the other end side in the transverse direction thereof.

The latch pawl member 44 is swingably supported on the pedal arm 42 by the support shaft 49 secured to the pedal arm 42 and extending through the slot 60, whereby the latch pawl member 44 is rotatable about the support shaft 49 in the directions of the arrows e–f and slidabe in the direction of the major axis of the slot 60 (the directions of the arrows c–d). The positions when the latch pawl member 44 is slid in the directions of the arrows c and d with respect to the support shaft 49 are hereinafter referred to as "reverse position" and "forward position", respectively, for convenience' sake of explanation as shown in FIG. 16.

In the catch portion 59 of the latch pawl member 44 is caught an action end 46a of a first urging member 46 comprising a torsion spring. A pair of support ends 46a and 46a of the first urging member 46 are hooked on the pedal arm 42. Thus, the position of the action end 46b relative to the support ends 46a and 46a is changed along with the rotation of the latch pawl member 44. In this embodiment, since the action end 46b of the first urging member 46 is selectively movable to both sides of a reference line $L_o$, which is a straight line connecting the fixing position of the support ends 46a and 46a to the pedal arm 42 and the axis of the support shaft 49, as shown in FIG. 11, a rotational urging force in the direction of the arrow e and a rotational urging force in the direction of the arrow f are selectively applied to the latch pawl member 44 based on the change of the position of the support ends 46a and 46a relative to the action end 46b as described later.

Figure 17:
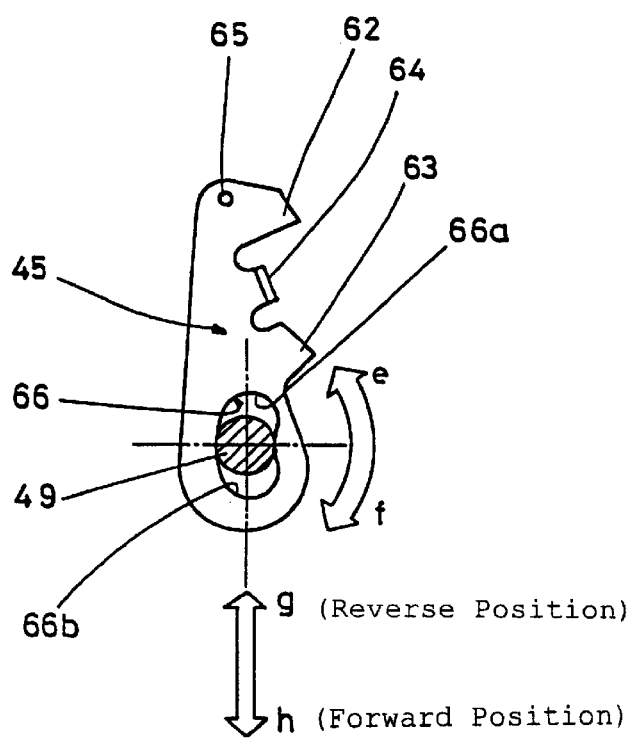
FIG. 17 is a front view of a position changing member shown in FIG. 11.

The position changing member 45 is an oblong plate having an arcuate slot 66 extending in the longitudinal direction thereof formed at one end side of the longitudinal direction thereof as shown in FIG. 17. On the other end side in the longitudinal direction of the latch pawl member 44, there are provided an engaging portion 64 with which the contact portion 57 of the latch pawl member 44 is engaged and first and second latch pawls 62 and 63 located on both side of the engaging portion 64. The first and second latch pawls 62 and 63, which are selectively engaged with the pawl teeth 52 of the pawl teeth member 43 as described later, have no function for maintaining a position relative to the pawl teeth member 43 (namely, locking function) even in this engaged state.

The position changing member 45 is disposed in the vicinity of the latch pawl member 44 and in opposed relation therewith. As is the case with the latch pawl member 44, the position changing member 45 is swingably supported on the pedal arm 42 by the support shaft 49 secured to the pedal arm 42 and extending through the slot 66, whereby the position changing member 45 is rotatable about the support shaft 49 in the directions of the arrows e–f and slidable along the arc of the slot 66b (the directions of the arrows g–h, for convenience' sake). The positions when the position changing member 45 is slid in the directions of the arrows g and h with respect to the support shaft 49 are hereinafter referred to as "reverse position" and "forward position", respectively, for convenience' sake of explanation.

In the vicinity of the second latch pawl 54 of the position changing member 45 is formed a catch portion 65, to which one end of a second urging member 47 comprising a coil spring is connected. The other end of the second urging member 47 is connected to the pedal arm 42. Thus, the position changing member 45 is normally rotationally urged in the direction of the arrow e by a spring force of the second urging member 47.

The spring force of the first urging member 46 is set at a value which is larger than that of the second urging member 47.

The operation of the parking brake device according to this embodiment will be hereinafter described with reference to FIG. 11 to FIG. 15.

① Set state (see FIG. 11)

The set state shown in FIG. 11 is a state in which no braking force is applied to the brake means as when the vehicle is running. The pedal arm 42 has been rotated at maximum in the direction of the arrow b. In this set state, since the action end 46b of the first urging member 46 is positioned above the reference line $L_0$ as shown in FIG. 11, the latch pawl member 44 has been forced upward by an urging force exerted on the action end 46b of the first urging member 46 into the "forward position" and is normally rotationally urged in the direction of the arrow e. The position changing member 45 has been forced downward by an urging force of the second urging member 47 into the "reverse position". The engaging portion 64 abuts on the contact portion 57 of the latch pawl member 44. Thus, the contact portion 57 of the latch pawl member 44 abuts on the retreat portion 54 of the pawl teeth member 43 and does not inhibit the pedal arm 42 from rotating at all. At this time, the sliding contact engagement portion 56 of the latch pawl member 44 is positioned in the vicinity of a guide portion 53 of the mounting bracket 41 and in opposed relation therewith.

Figure 12:
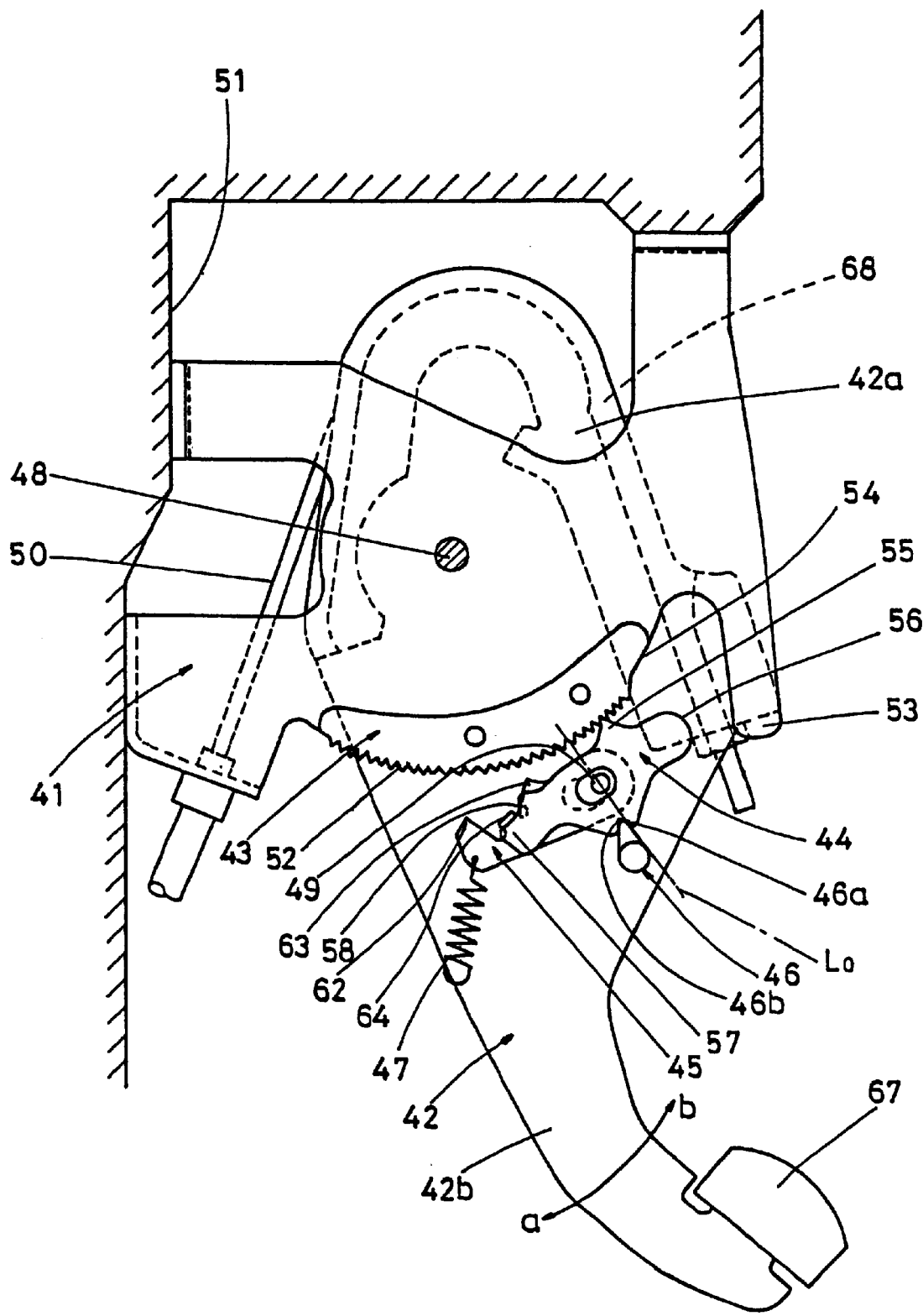
FIG. 12 is a view explanatory of the structure of an essential part of the parking brake device for a vehicle shown in FIG. 11 in a locked state.

② At the time of braking operation from the set state (see FIG. 11 and FIG. 12)

When the pedal arm 42 is stepped on from the set state shown in FIG. 11 and rotated in the direction of the arrow a, the latch pawl 55 of the latch pawl member 44 is moved from the side of the retreat portion 54 to the side of the latch pawl member 44 by a forward movement of the latch pawl member 44 along with the rotation of the pedal arm 42, and moved on the pawl teeth 52, 52, . . . , repeating engagement therewith and disengagement therefrom while the rotating operation of the pedal arm 42 is being continued. At this time, the latch pawl member 44 is urged by the urging force of the first urging member 46 such that the latch pawl 55 is constantly pressed against the pawl teeth 52, 52, . . . .

When the stepping operation of the pedal arm 2 is ceased and the stepping force applied thereto is released, a tensile force of the parking cable 50 is exerted on the pedal arm 42, which receives a restoring rotational force in the direction of the arrow b. At this time, the support shaft 49 secured to the pedal arm 49 is moved upward together therewith, and the latch pawl member 44 is shifted from "forward position" to the "reverse position" shown in FIG. 12. The latch pawl 55 of the latch pawl member 44 is locked with a specific tooth 52 of the pawl teeth member 43 by a pressing force caused by the tensile force of the parking cable 50 applied via the support shaft 49 and maintained in that position. Namely, the braking force corresponding to the amount of stepping of the pedal arm 42 is maintained (namely, in a maintained state after the completion of the braking operation).

In this case, the action end 46b of the first urging member 44 is moved from above to below the reference line $L_0$ (see FIG. 12) along with the movement of the latch pawl member 44 from the "forward position" to the "reverse position", and an urging force generated at the action end 46b of the first urging member 46 urges the latch pawl member 44 in the direction of the arrow f (namely, in such a direction that the latch pawl 55 is moved away from the pawl teeth 52 of the pawl teeth member 43). However, the urging force of the first urging member 46 is smaller than that caused by the tensile force of the parking cable 50 so that the position of the latch pawl member 44 is maintained with the latch pawl 55 in locking engagement with the pawl teeth 52 of the pawl teeth member 43 irrespective of the urging force of the first urging member 46. The position of the latch pawl member 44 at this time is the locked position mentioned in claims.

Figure 13:
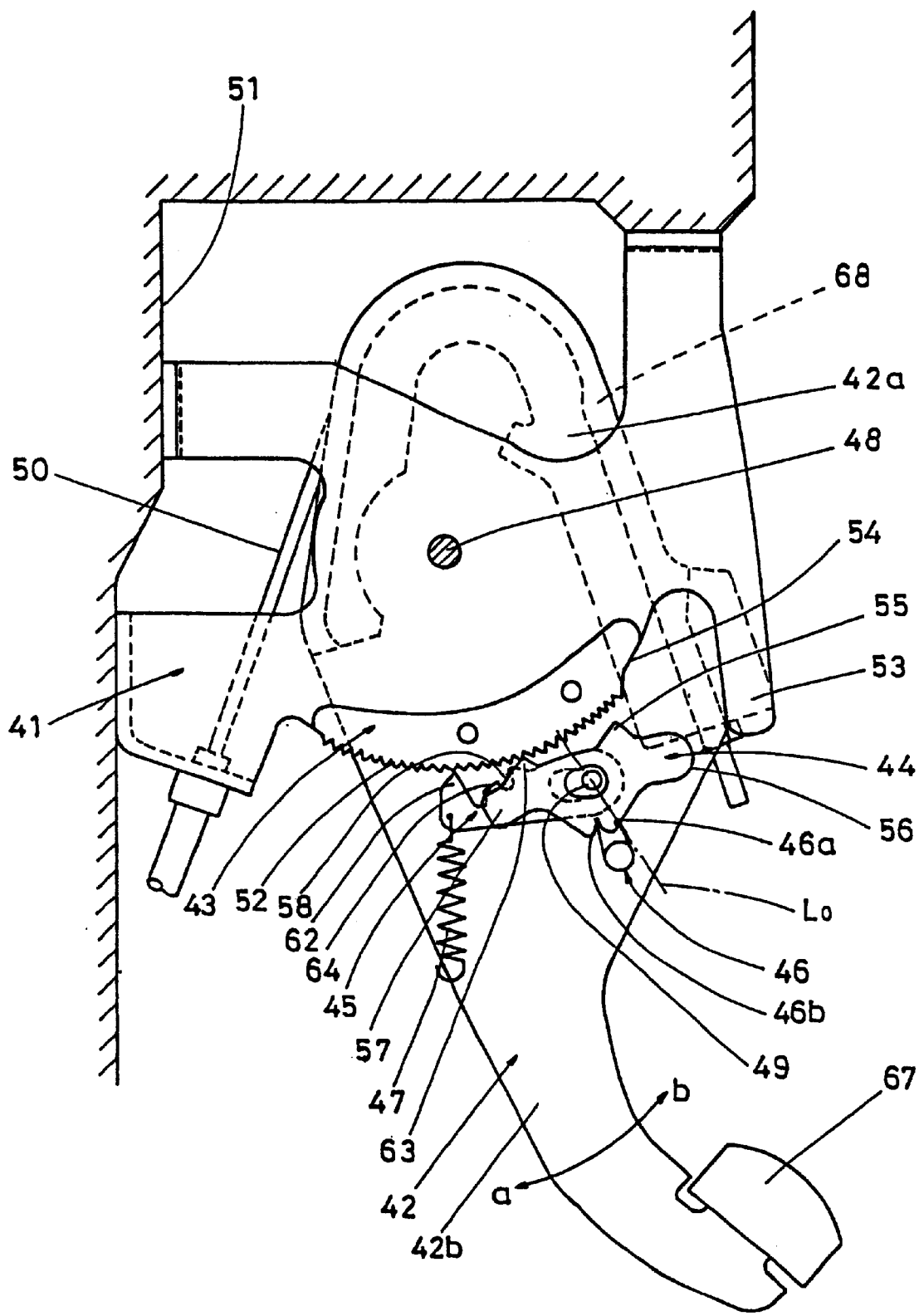
FIG. 13 is a view explanatory of the structure of an essential part of the parking brake device for a vehicle shown in FIG. 11 in an unlocked state.

③ Releasing operation of braking maintained state (see FIG. 13)

When the braking maintained condition shown in FIG. 12 is released prior to releasing the braking force to allow the vehicle to run or conducting additional stepping to increase the braking force, firstly, the pedal arm 42 is slightly stepped on from the rotational position in the braking maintained condition and rotated in the direction of the arrow a as shown in FIG. 13 (the "amount of rotation" at this time is sufficient when it is large enough to be able to release the locking engagement of the latch pawl 55 with the pawl tooth 52, and corresponds to "determined amount" mentioned in claims).

Then, since the pressing force exerted between the latch pawl 55 of the latch pawl member 44 and the pawl teeth 52 of the pawl teeth member 43 is vanished, the latch pawl member 44 is rotated in the direction of the arrow f by the urging force of the first urging member 46 and the locking engagement of the latch pawl 55 with one of the pawl teeth 52 of the pawl teeth member 43 is released. The position of the latch pawl member 44 at this time is the unlocked position mentioned in Claims.

At this time, along with the rotation of the latch pawl member 44 in the direction of the arrow f, the rotational force thereof is transmitted via the contact portion 57 of the latch pawl member 44 to the engaging portion 64 of the position changing member 45 so that the position changing member 45 is rotated in the direction of the arrow f against the urging force of the second urging member 8 and the second latch pawl 63 thereof is brought into engagement with one of the pawl teeth 52 of the pawl teeth member 43, whereby the position changing member 45 is inhibited from further rotating in the direction of the arrow f.

The second latch pawl 63 of the position changing member 45 is pressed against the pawl teeth 52 of the pawl teeth member 43 by the difference between the urging force of the first urging member 46 and the urging force of the second urging member 8 so that the position changing member 45 and the latch pawl member 44 are both rotatable in the direction of the arrow e.

Figure 14:
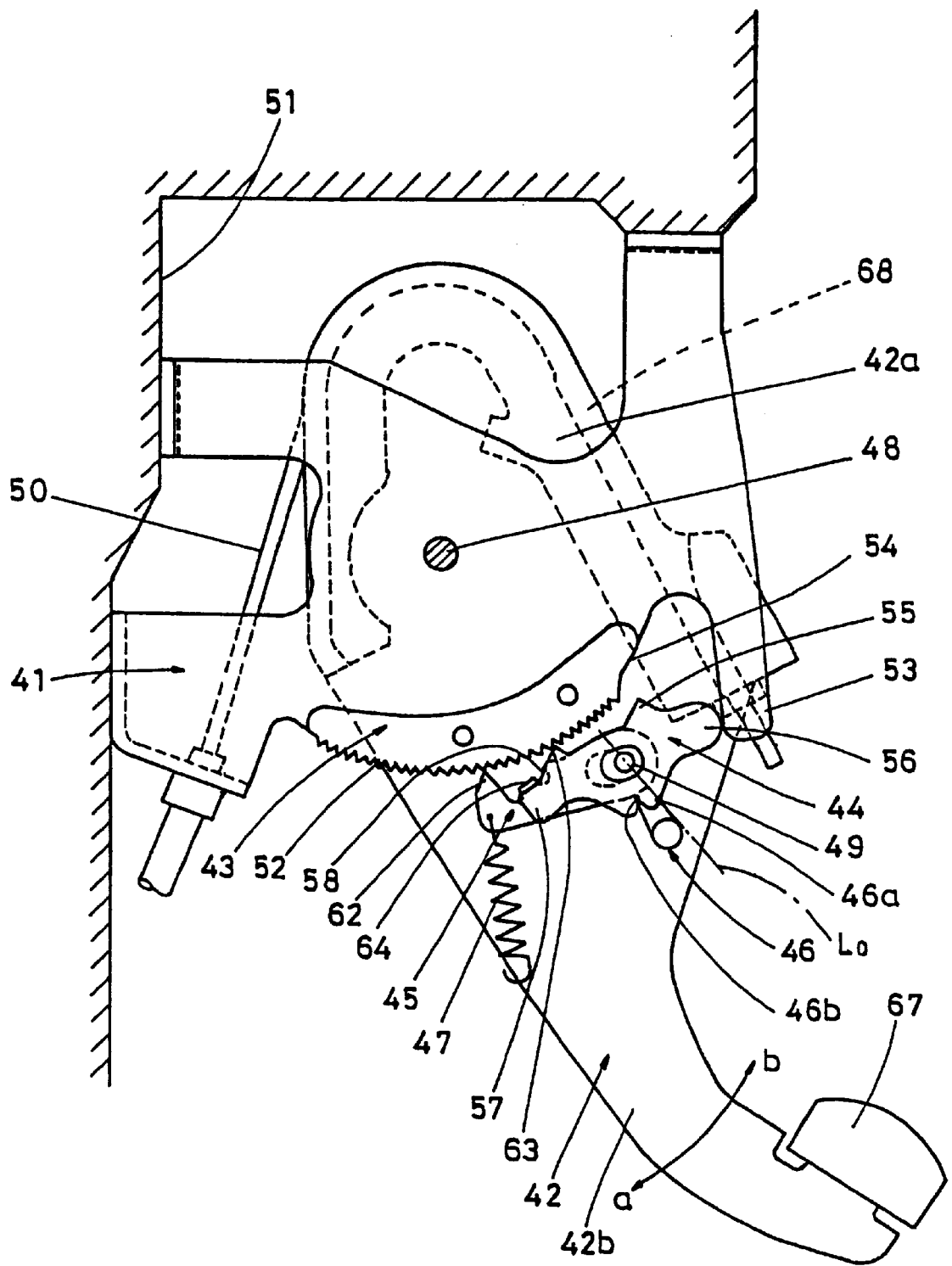
FIG. 14 is a view explanatory of the structure of the parking brake device for a vehicle shown in FIG. 11 during a return movement of a pedal.

④ Operation for releasing a braking force (see FIG. 13 and FIG. 14)

When the braking force is vanished from the braking released state by rotating the pedal arm 42 in the direction of the arrow b, it is only necessary that the pedal arm 42 is rotated in the direction of the arrow b by the tensile force of the brake wire 10 from the state shown in FIG. 13 (the state in which the braking maintained condition is released).

In this case, the second latch pawl 63 of the position changing member 45 is slid on the pawl teeth 52, 52 . . . of the pawl teeth member 43, repeating engagement therewith and disengagement therefrom along with the rotating operation of the pedal arm 42 in the direction of the arrow b and allows the pedal arm 42 to rotate in the direction of the arrow b. The latch pawl member 44 is moved backward along with the rotation of the pedal arm 42 in the direction of the arrow b so that the latch pawl 55 thereof is moved away from the position corresponding to the pawl teeth 52, 52, . . . of the pawl teeth member 43 to the side of the retreat portion 54. Then, the sliding contact engagement portion 56 of the latch pawl member 44 abuts on the guide portion 53 of the mounting bracket 41 so that the latch pawl member 44 is forcibly rotated in the direction of the arrow e by a pressing force from the guide portion 53. When the pedal arm 42 is rotated at maximum in the direction of the arrow b, the latch pawl 55 of the latch pawl member 44 abuts on the retreat portion 54 of the pawl teeth member 43 and is brought into the set state shown in FIG. 11. Thereby, the braking force is completely released so that the vehicle is allowed to run.

Figure 15:
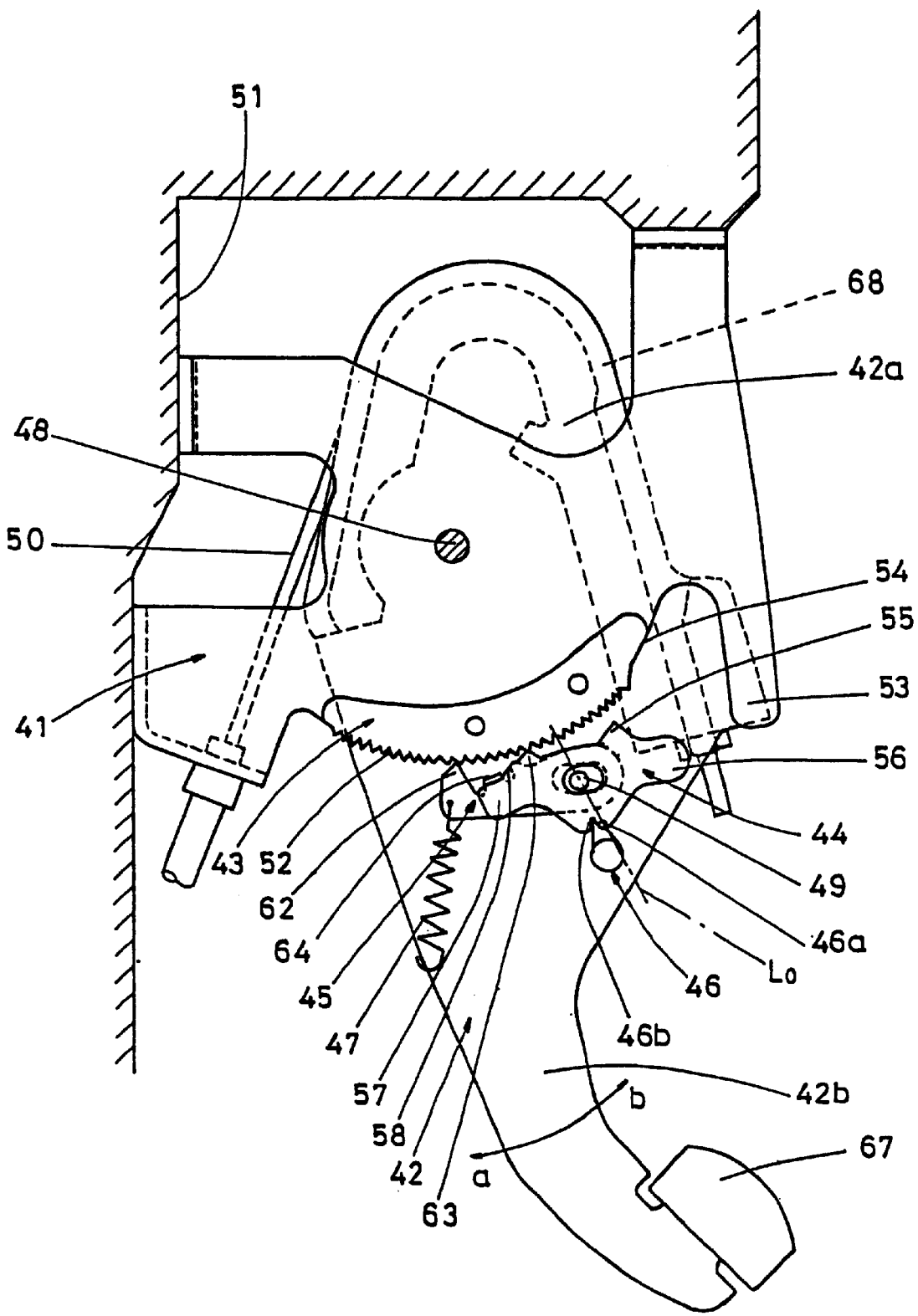
FIG. 15 is a view explanatory of the structure of the parking brake device for a vehicle shown in FIG. 11 at the time of an additional stepping.

⑤ Additional stepping from the braking released state (see FIG. 13 and FIG. 15)

When the braking force set by an initial braking operation is thought to be insufficient, an additional stepping is conducted to additionally increase the braking force. Namely, in this case, the pedal arm 42 is stepped on from the braking released state shown in FIG. 13 and rotated in the direction of the arrow a. Then, the support shaft 49 is moved forward along with the rotating operation and the latch pawl member 44 is shifted from the "forward position" to the "reverse position". When the pedal arm 42 is further stepped on, the latch pawl member 44 is moved relative to the position changing member 45 along with the forward movement thereof, and a portion of the latch pawl member 44 abutting on the engaging portion 64 of the position changing member 45 is shifted from the contact portion 57 to the side of the guide portion 58.

Along with the movement of the latch pawl member relative to the position changing member 45, the latch pawl member 44 is urged to rotate in the direction of the arrow e by the urging force of the first urging member 46 and, finally, the latch pawl 55 is brought into locking engagement with one of the pawl teeth 52 of the pawl teeth member 43. The position changing member 45 receives a pressing force from the latch pawl member 44 and is urged to rotate in the direction of the arrow f, whereby the first latch pawl 62 is brought into locking engagement with one of the pawl teeth 52 of the pawl teeth member 43 in addition to the second latch pawl 63, whereby the position changing member 45 is inhibited from further rotating in the direction of the arrow f. Finally, an action for inhibiting the position changing member 45 from rotating is released along with the rotation of the latch pawl member 44 in the direction of the arrow e, whereby the position changing member 45 is rotated in the direction of the arrow e by the urging force of the second urging member 8 so that the second latch pawl 63 and the first latch pawl 62 are both removed from the pawl teeth member 43. Thereby, the transition to a state in which braking operation is conductible is completed.

After that, the pedal arm 42 is stepped on to a desired rotational position (namely, a position where a desired braking force can be obtained) and rotated in the direction of the arrow a. After the rotation, when the stepping force applied to the pedal arm 42 is released, the latch pawl 55 of the latch pawl member 44 is brought into locking engagement with one of the pawl teeth 52 of the pawl teeth member 43 and maintained in that state as shown in FIG. 12. Thereby, the additional stepping operation is completed.

As the action in the braking release operation after the additional stepping operation is the same as the that described in ③ and ④, the description is omitted here.

As is described above, in the parking brake device according to the second embodiment, a required braking force can be generated and maintained by stepping on pedal arm 42. Also, the maintained condition is released and an operation for releasing the braking force by restoring the pedal arm 42 is permitted by stepping on the pedal arm 42 by a determined amount from the maintained condition. Moreover, the braking force can be increased and maintained by stepping the pedal arm 42 by an amount over the above determined amount from the maintained condition.

The parking brake for a vehicle according to the present invention has a braking force increasing function by which the braking force can be additionally increased by a stepping operation in addition to functions which conventional foot-operated parking brakes have, namely, a function of "setting a braking force by a stepping operation" and a function of "releasing a braking force by a stepping operation". Thus, as compared with a conventional parking brake in which, when the braking force is not sufficient, the braking action must be once released and the stepping operation must be conducted once again, the operation for increasing braking force is easy and can be conducted more rapidly, thereby improving the operability. Moreover, since the braking force is maintained through the additional stepping operation and the continuity of the braking force is secured, the reliability during operation is enhanced as compared with a conventional constitution in which the braking force is discontinuous before and after the operation for increasing the braking force and there exists a period during which the braking force is vanished.

What is claimed is:

1. A parking brake device for a vehicle having brake means, comprising:
   a pedal arm (2) having pawl teeth (12) and operatively connected to said brake means such that said brake means performs a braking action when said pedal arm is stepped on;
   a latch pawl member (4) including a latch pawl (15) engageable with said pawl teeth (12) of said pedal arm (2), movable between a locked position in which said latch pawl (15) is in locking engagement with said pawl teeth (12) and an unlocked position in which said locking engagement of said latch pawl (15) with said pawl teeth (12) is released, said latch pawl member (4) assuming said locked position, when said pedal arm (2) is stepped on, to maintain said pedal arm (2) in a stepped-on position at the moment and assuming said unlocked position, when said pedal arm (2) is further stepped on from said stepped-on position by a determined amount, to allow said pedal arm (2) to rotate in a direction opposite to the stepping direction thereof;

a position changing member (5) supported on a common support shaft (9) for said latch pawl member (4) and provided with a latch pawl (22) engageable with said pawl teeth (12) of said pedal arm (2), said position changing member (5) being operatively connected to said pedal arm (2) and said latch pawl member (4) and adapted for shifting said latch pawl member (4) from said unlocked position to said locked position by a stepping force applied to said pedal arm (2) when said pedal arm (2) is stepped on by an amount over said determined amount;

a first engaging portion (23) provided on said position changing member (5) and engageable with said latch pawl member (4) when said latch pawl member (4) assumes said locked position to maintain said position changing member (5) at such a position that said latch pawl (22) is separated from said pawl teeth (12) of said pedal arm (2); and a second engaging portion (24) provided on said position changing member (5) and engageable with said latch pawl member (4) when said latch pawl member (4) assumes said unlocked position to maintain said position changing member (5) at such a position that said latch pawl (22) is engaged by said pawl teeth (12) of said pedal arm (2).

2. A parking brake device for a vehicle having brake means, comprising:

a pedal arm (42) rotatably mounted on a mounting bracket (41) fixedly disposed on a vehicle body and operatively connected to said brake means such that said brake means performs a braking action when said pedal arm is stepped on;

a pawl teeth member (43) including pawl teeth (52) and fixed to said mounting bracket (41);

a latch pawl member (44) including a latch pawl (55) engageable with said pawl teeth (52) of said pawl teeth member (43), movable between a locked position in which said latch pawl (55) is in locking engagement with said pawl teeth (52) and an unlocked position in which said locking engagement of said latch pawl (55) with said pawl teeth (52) is released, said latch pawl member (44) assuming said locked position, when said pedal arm (42) is stepped on, to maintain said pedal arm (42) in a stepped-on position at the moment and assuming said unlocked position, when said pedal arm (42) is further stepped on from said stepped-on position by a determined amount, to allow said pedal arm (42) to rotate in a direction opposite to the stepping direction thereof;

a position changing member (45) supported on a common support shaft (49) for said latch pawl member (44) and operatively connected to said pedal arm (42) and said latch pawl member (44) for shifting said latch pawl member (44) from said unlocked position to said locked position by a stepping force applied to said pedal arm (42) when said pedal arm (42) is stepped on by an amount over said determined amount; and an engaging portion (64) provided on said position changing member (45) and engageable with said latch pawl member (44) when said latch pawl member (44) assumes said locked position to maintain the position of said position changing member (45), and with said latch pawl member (44) when said latch pawl member (44) assumes said unlocked position to maintain the position of said latch pawl member (44).

* * * * *